(12) United States Patent
Manser et al.

(10) Patent No.: US 11,616,802 B2
(45) Date of Patent: *Mar. 28, 2023

(54) METHODS AND SYSTEM FOR AUTOMATED AD HOC CUSTOMER PREMISE EQUIPMENT BI-DIRECTIONAL VULNERABILITY SCANNING

(71) Applicant: Charter Communications Operating, LLC, St. Louis, MO (US)

(72) Inventors: Charles James Manser, Clearwater, FL (US); Jeffrey Murray Rowell, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/568,006

(22) Filed: Jan. 4, 2022

(65) Prior Publication Data
US 2022/0131891 A1 Apr. 28, 2022

Related U.S. Application Data

(63) Continuation of application No. 16/922,573, filed on Jul. 7, 2020, now Pat. No. 11,252,177.

(51) Int. Cl.
*H04L 9/40* (2022.01)
*H04L 12/28* (2006.01)
*H04L 12/46* (2006.01)
*H04L 61/5014* (2022.01)
*H04L 101/622* (2022.01)

(52) U.S. Cl.
CPC ...... *H04L 63/1433* (2013.01); *H04L 12/2801* (2013.01); *H04L 12/4679* (2013.01); *H04L 63/1416* (2013.01); *H04L 2101/622* (2022.05)

(58) Field of Classification Search
CPC combination set(s) only.
See application file for complete search history.

(56) References Cited

U.S. PATENT DOCUMENTS

| | | |
|---|---|---|
| 2016/0359752 A1 | 12/2016 | Zhang et al. |
| 2019/0081958 A1 | 3/2019 | Lee |
| 2021/0306213 A1 | 9/2021 | Medvinsky et al. |
| 2021/0314238 A1 | 10/2021 | Cioffi et al. |

*Primary Examiner* — Asghar H Bilgrami
(74) *Attorney, Agent, or Firm* — Young Basile Hanlon & MacFarlane, P.C.

(57) ABSTRACT

Methods and systems for automated ad hoc customer premise equipment (CPE) bi-directional vulnerability scanning. A method includes an auto provisioning server receiving CPE information for a designated CPE to initiate a bi-directional vulnerability scan, obtaining telemetry data from a cable modem termination system (CMTS) based on the CPE information, configuring switches to form a virtual local area network channel between a LAN scanner and the designated CPE using the CPE information, provisioning the LAN scanner to obtain a LAN side Internet Protocol (IP) address from the designated CPE, initiating vulnerability scans at a wide area network (WAN) scanner and the LAN scanner using a stored WAN side IP address and a stored LAN side IP address, respectively, and generating a vulnerability scan report based on results from the WAN scanner and the LAN scanner. At least one network device can be configured based on the report.

20 Claims, 4 Drawing Sheets

METHODS AND SYSTEM FOR AUTOMATED AD HOC CUSTOMER PREMISE EQUIPMENT BI-DIRECTIONAL VULNERABILITY SCANNING

CROSS REFERENCE TO RELATED APPLICATION

This application is a continuation of U.S. application Ser. No. 16/922,573 filed Jul. 7, 2020, of which is incorporated herein by reference.

TECHNICAL FIELD

This disclosure relates to vulnerability scanning of customer premise equipment (CPE). More specifically, this disclosure relates to automated vulnerability scanning of CPEs from service provider and customer facing surfaces.

BACKGROUND

Multiple-system operators (MSOs), cable companies, and the like (collectively "service providers") need to perform vulnerability scans on the service provider network and computers and other devices attached to the service provider network, including for example, customer premise equipment (CPE). Vulnerability scans inspect and detect security system weaknesses. In general, the CPEs have two attack surfaces from which attackers may try to exploit weaknesses or holes in the CPEs security system. The two attack surfaces are a service provider facing or wide area network (WAN) side and a customer facing or local area network (LAN) side. Security vulnerability scanning and testing requires access, set-up and configuration, which can take a substantial amount of time considering the thousands of types of CPEs, each having multiple makes, models, and firmware updates.

SUMMARY

Disclosed herein are methods and systems for automated ad hoc customer premise equipment (CPE) bi-directional vulnerability scanning.

In implementations, a method for automated customer premise equipment (CPE) bi-directional vulnerability scanning includes receiving, by an auto provisioning server, CPE information for a designated CPE to initiate a bi-directional vulnerability scan, obtaining, by the auto provisioning server, telemetry data from a cable modem termination system (CMTS) based on the CPE information, configuring, by the auto provisioning server using the CPE information, switches to form a virtual local area network (VLAN) channel between a LAN scanner and the designated CPE, provisioning, by the auto provisioning server, the LAN scanner to obtain a LAN side Internet Protocol (IP) address from the designated CPE, initiating, by the auto provisioning server, vulnerability scans at a wide area network (WAN) scanner and the LAN scanner using a stored WAN side IP address and a stored LAN side IP address, respectively, generating, by the auto provisioning server, a vulnerability scan report based on results from the WAN scanner and the LAN scanner, and configuring at least one network device based on the report.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and systems for automated ad hoc customer premise equipment (CPE) bi-directional vulnerability scanning which reduce the workload associated therewith. In an implementation, the described techniques provide a mechanism for performing ad-hoc bi-directional security scans without any knowledge of the environment or device prior to starting or initiating the scan along with complete automation of security certification of the CPEs. The bi-directionality of the techniques enables security scans to be run from both the wide area network (WAN) side and the local area network (LAN) side. That is, vulnerability scanning can be performed from the service provider or public internet side or from inside a customer's premise or customer facing side.

In implementations, the automated ad hoc CPE bi-directional vulnerability scanning system can use a Media Access Control (MAC) address for a designated device to search into different systems and automatically find the information necessary, including Internet Protocol (IP) addresses, to run a vulnerability scan. In implementations, the MAC address is provided by an external system to enable amicable usage of the automated ad hoc bi-directional scanning technique. An automated configuration verification is performed on telemetry data obtained based on the MAC address by verifying device configuration against an expected standard for vendors and device types. Vulnerability scans are posted to appropriate vulnerability scanners based on the IP addresses determined from the MAC address. For example, the vulnerability scanners can include a WAN scanner and a LAN scanner. The system collates and prepares a report based on the results from the WAN scanner and the LAN scanner. In implementations, the report is sent to the external system. The results in the report can be used to provide configuration updates to the CPEs in case of reported security flaws. The automated system is needed due to the sheer volume of testing cycles between multiple vendors, and each vendor having multiple makes and models whose firmware is tested and updated on an iterative cycle. Each device needs security scans for certification approval, and the automated system increases scan turnaround time for the certification process by, for example, a tenfold factor.

In implementations, the described techniques uses an automated Dynamic Host Configuration Protocol (DHCP) technique and a virtual LAN (VLAN) configuration to connect the LAN scanner to one of multiple CPEs. The automated ad hoc CPE bi-directional vulnerability scanning system uses the MAC address to provision a VLAN tag and configure a layer 2 switch network to connect the LAN scanner to a designated CPE via a VLAN channel using the VLAN tag. The LAN scanner is configured to request and accept, via the automated DHCP technique and configured VLAN tag and channel, an IP address from the designated CPE. This enables the system to scan one of infinitely many CPEs at any point in time from the LAN or private network side. This addresses the need to manually and physically connect a laptop behind a CPE device, which requires physical access to the device under test which isn't always feasible. In addition, the configurability of the LAN scanner addresses the need for multiple laptops if 1,000 LAN scans need to be performed.

Figure 1:
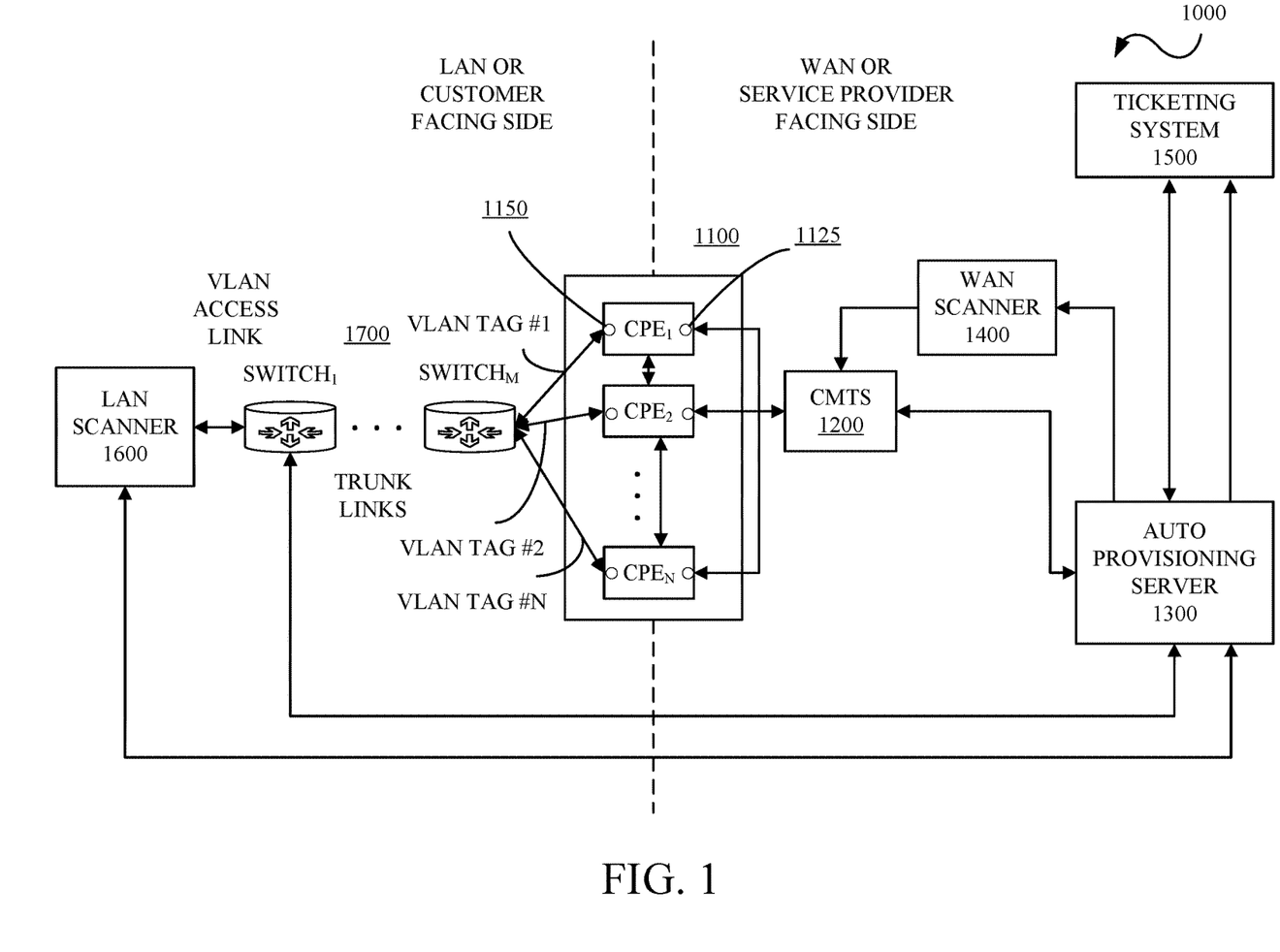
FIG. 1 is a diagram of an example network in accordance with embodiments of this disclosure.

FIG. 1 is a diagram of an example network 1000 in accordance with some embodiments of this disclosure. The network 1000 includes customer premise equipment (CPE)

1100 including $CPE_1, CPE_2, \ldots, CPE_N$ 1110, cable modem termination system (CMTS) 1200, an auto provisioning server 1300, a wide area network (WAN) scanner 1400, a ticketing system 1500, a local area network (LAN) scanner 1600, and switches 1700. The $CPE_1, CPE_2, \ldots, CPE_N$ 1110, the CMTS 1200, the auto provisioning server 1300, the WAN scanner 1400, the ticketing system 1500, the LAN scanner 1600, and the switches 1700 can be connected to or be in communication with (collectively "connected to") each other, as appropriate and applicable, using wired and wireless techniques, systems, and devices, including but not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The CPEs 1100, can be, but are not limited to, end user devices, telephones, routers, network switches, gateways, set-top boxes, fixed mobile convergence products, home networking adapters and Internet access gateways that enable customers to access a service provider's services and distribute them in a residence, enterprise, office, or like infrastructure. In implementations, the CPEs 1100 may be equipment located at a customer's premises and connected with a service provider's network and/or telecommunication equipment, including for example, CMTS 1200. In implementations, each of the CPEs 1100 may include access ports 1125 which connect to the service provider's network and/or telecommunication equipment (collectively "WAN or service provider facing side") and access ports 1150 which connect to end user devices, mobile devices, laptops, computing devices, media devices, and the like (collectively "LAN or customer facing side"). Each CPE 1100 can include or implement DHCP to provide initial and updated network configurations (referred to as DHCP options) and services to requesting devices such as the LAN scanner 1600, the CMTS 1200, and the like. The DHCP is a network management protocol which dynamically assigns an IP address and other network configuration parameters to each device on a network so the device can communicate with other network elements or devices.

The CMTS 1200 is typically located in a service provider's central office, headend, or hubsite and provides high speed data services, such as cable Internet or Voice over Internet Protocol, to service provider subscribers.

The auto provisioning server 1300 is connected to the CMTS 1200, the WAN scanner 1400, the ticketing system 1500, the LAN scanner 1600, and the switches 1700. The auto provisioning server 1300 controls and manages the automated ad hoc CPE bi-directional vulnerability scanning methods and techniques described herein. The auto provisioning server 1300 requests and receives queries from the ticketing system 1500, requests CPE 1100 telemetry data, network telemetry data, configuration information, and the like from the CMTS 1200, performs configuration verification, stores WAN IP address(es), provisions VLAN tag and configures VLAN channel using the switches 1700, provisions and configures the LAN scanner 1600, stores LAN IP address(es), initiates scanning by the WAN scanner 1400 and the LAN scanner 1600, and generates and submits scanning report to the ticketing system 1500.

The WAN scanner 1400 performs vulnerability scanning on the WAN side of the designated CPE 1100 and reports results to the auto provisioning server 1300. In implementations, the WAN scanner 1400 can be an application or software implemented as or on a computer, computing device, computing platform, and the like, provided as a service, and/or combinations thereof.

The ticketing system 1500 indicates which CPE 1100 to perform a vulnerability scan on and as appropriate configures the CPE 1100, the CMTS 1200, other network devices, and/or combinations thereof in the event of security flaws or breaches.

The LAN scanner 1600 performs vulnerability scanning on the LAN side of the designated CPE 1100 and reports results to the auto provisioning server 1300. The LAN scanner 1600 is configured to request and accept multiple IP addresses using DHCP. In implementations, the LAN scanner 1400 can be an application or software implemented as or on a computer, computing device, computing platform, and the like, provided as a service, and/or combinations thereof.

The switches 1700 include one or more switches which are configurable by the auto provisioning server 1300 to connect the LAN scanner 1600 to a designated CPE of the CPEs 1100. In implementations, the switches 1700 are configured as a VLAN channel and data packets are tagged with VLAN tags for traversal over the VLAN channel between the LAN scanner 1600 and the designated CPE. In implementations, each CPE 1100 has an associated VLAN tag, e.g., VLAN TAG #1, VLAN TAG #2, . . . , VLAN TAG #N.

Figure 2:
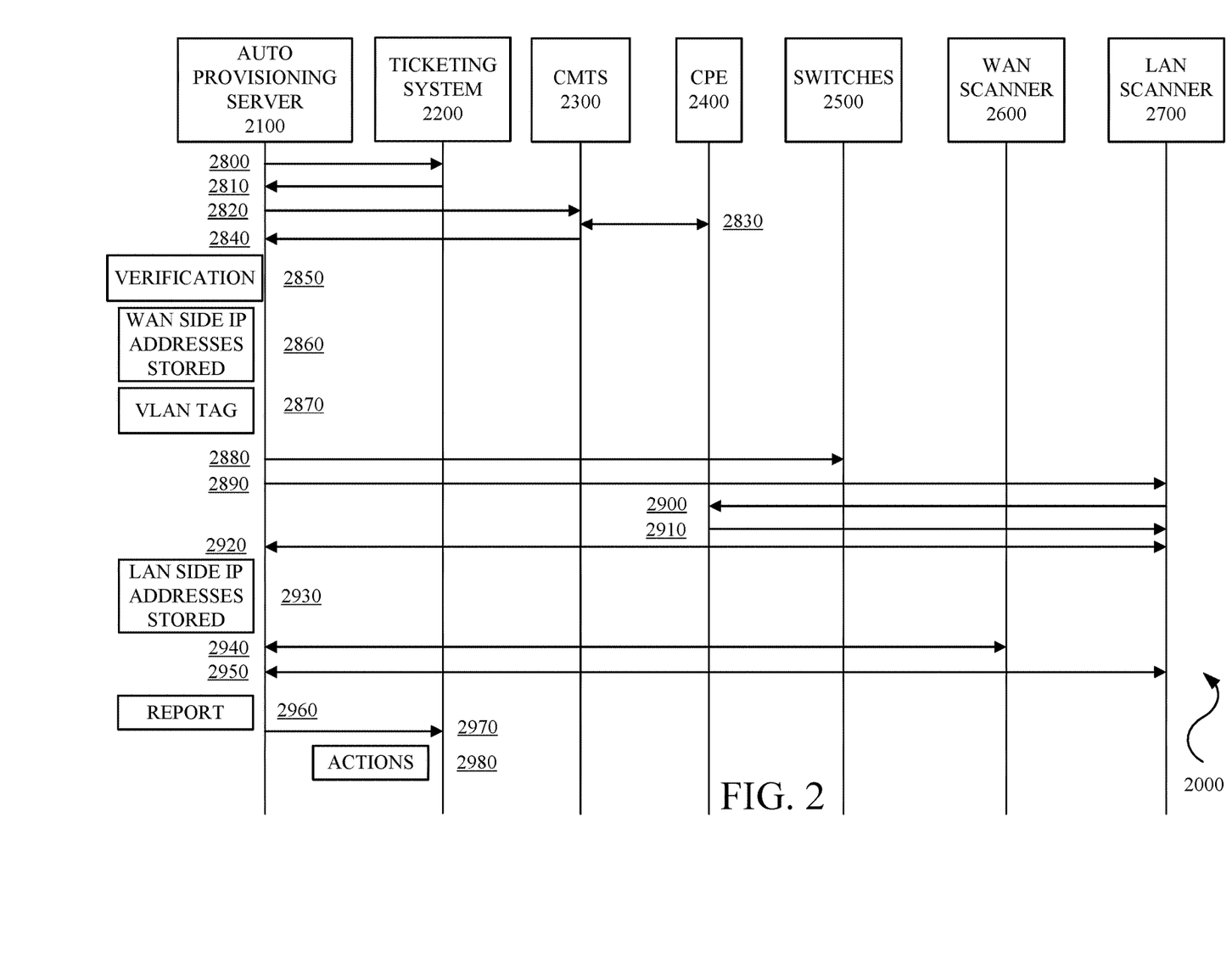
FIG. 2 is a diagram of an example flow diagram of automated ad hoc customer premise equipment (CPE) bi-directional vulnerability scanning in accordance with embodiments of this disclosure.

FIG. 2 is a diagram of an example automated ad hoc CPE bi-directional vulnerability scanning flow diagram 2000 in accordance with embodiments of this disclosure. The automated ad hoc CPE bi-directional vulnerability scanning flow diagram 2000 describes communications and events with respect to an auto provisioning server 2100, a ticketing system 2200, a CMTS 2300, a CPE 2400, switches 2500, a WAN scanner 2600, and a LAN scanner 2700.

Operationally, with reference to FIG. 1 and FIG. 2, the auto provisioning server 2100 can send a request to the ticketing system 2200 for vulnerability scan work (2800). In implementations, the work can be requested on an ad hoc basis, periodic basis, event driven basis, or combinations thereof. In implementations, the ticketing system 2200 can automatically send vulnerability scan work to the auto provisioning server 2100 on an ad hoc basis, periodic basis, event driven basis, or combinations thereof. The ticketing system 2200 can send a MAC address, location information or designation, and other information regarding a designated or selected CPE 2400 (collectively "designated CPE information") (2810).

The auto provisioning server 2100 can query the CMTS 2300 using the MAC address of the designated CPE 2400 to obtain CPE telemetry data, CMTS telemetry data, network telemetry data, and the like (collectively "telemetry data") (2820). The telemetry data can include, but is not limited to, MAC address, CPE type, termination system, software version, the make and/or model of the CPE, and the like. The CMTS 2300 can obtain the CPE telemetry data from the CPE 2400 (2830). The CMTS 2300 cans send the telemetry data to the auto provisioning server 2100 (2840). The auto provisioning server 2100 can perform a configuration verification or validation between the designated CPE information and the telemetry data (2850). The auto provisioning server 2100 can store WAN side IP address(es) for WAN side scanning based on a successful validation phase (2860).

The auto provisioning server 2100 can generate a VLAN tag based on the location information received from the ticketing system (2870). In implementations, the location information can be a numeric designation. An algorithm can be applied to the numeric designation to determine the correct VLAN tag with which to provision a layer 2 switch network configuration, i.e. a VLAN channel. In implementations, the numeric designation can have a format "w.x.y.z" and an example algorithm can be: x*16+(y*100−16)+z+ 2600. The auto provisioning server 2100 can configure the switches 2500 using the generated VLAN tag to establish the VLAN channel (2880).

The auto provisioning server 2100 can configure the DHCP on the LAN server 2700 to request an IP address from the designated CPE 2400 using the generated VLAN tag over the VLAN channel (2890). The LAN server 2700 can request the IP address(es) from the CPE 2400 (2900). The DHCP on the designated CPE 2400 can send the LAN side IP address(es) (2910). The auto provisioning server 2100 can obtain the LAN side IP address(es) after the DHCP provisioning completes (2920) and store the LAN side IP address(es) (2930). The auto provisioning server 2100 can initiate vulnerability scans by sending the WAN side IP address(es) to the WAN scanner 2600 and the WAN scanner 2600 can send the vulnerability scanning results to the auto provisioning server 2100 (2940). The auto provisioning server 2100 can initiate vulnerability scans by sending the LAN side IP address(es) to the LAN scanner 2700 and the LAN scanner 2700 can send the vulnerability scanning results to the auto provisioning server 2100 (2950).

The auto provisioning server 2100 can generate a vulnerability scanning report (2960) and send the report to the ticketing system 2200 (2970). In implementations, the ticketing system 2200 can configure or take other actions with respect to the CPE 2400, the CMTS, and other network devices based on security flaws or breaches (2980).

Figure 3:
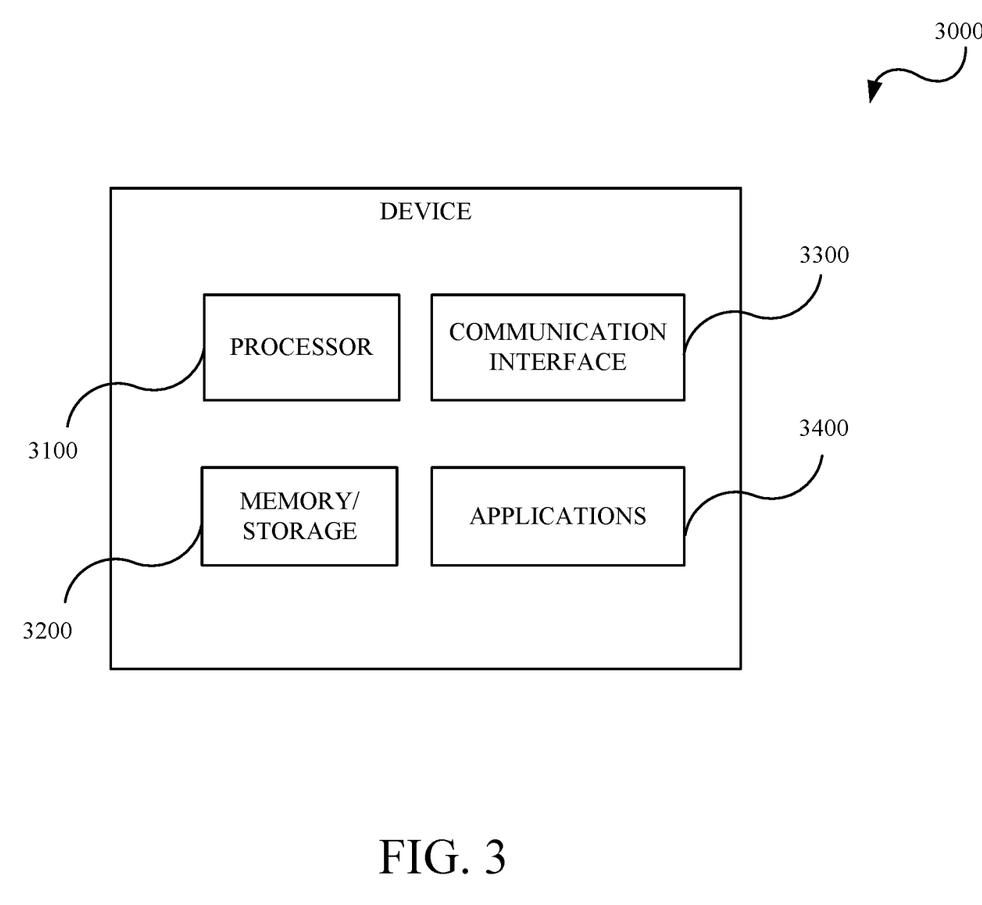
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the CPE 1100 (CPE$_1$, CPE$_2$, . . . , CPE$_N$ 1110), the CMTS 1200, the auto provisioning server 1300, the WAN scanner 1400, the ticketing system 1500, the LAN scanner 1600, and the switches 1700. The applications can be, but not limited to, the LAN scanner, the WAN scanner, DHCP, and the like. In an implementation, appropriate memory/storage 3200 may store the IP addresses for the WAN side, the IP addresses for the LAN side, the MAC address, the VLAN tags, the report, and the like. In an implementation, appropriate memory/storage 3200 is encoded with instructions for at least controlling and managing the automated ad hoc CPE bi-directional vulnerability scanning methods and techniques described herein including, but not limited to, requesting and receiving a designated CPE, requesting CPE telemetry data, network telemetry data, configuration information, performing configuration verification, storing WAN side IP address(es), provisioning VLAN tags and configuring VLAN channels, provisioning and configuring the LAN scanner, storing LAN side IP address(es), initiating scanning by the WAN scanner and the LAN scanner, generating and submitting scanning reports, configuring CPEs, configuring CMTS, and the like. The automated ad hoc CPE bi-directional vulnerability scanning techniques or methods described herein may be stored in appropriate memory/storage 2200 and executed by the appropriate processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
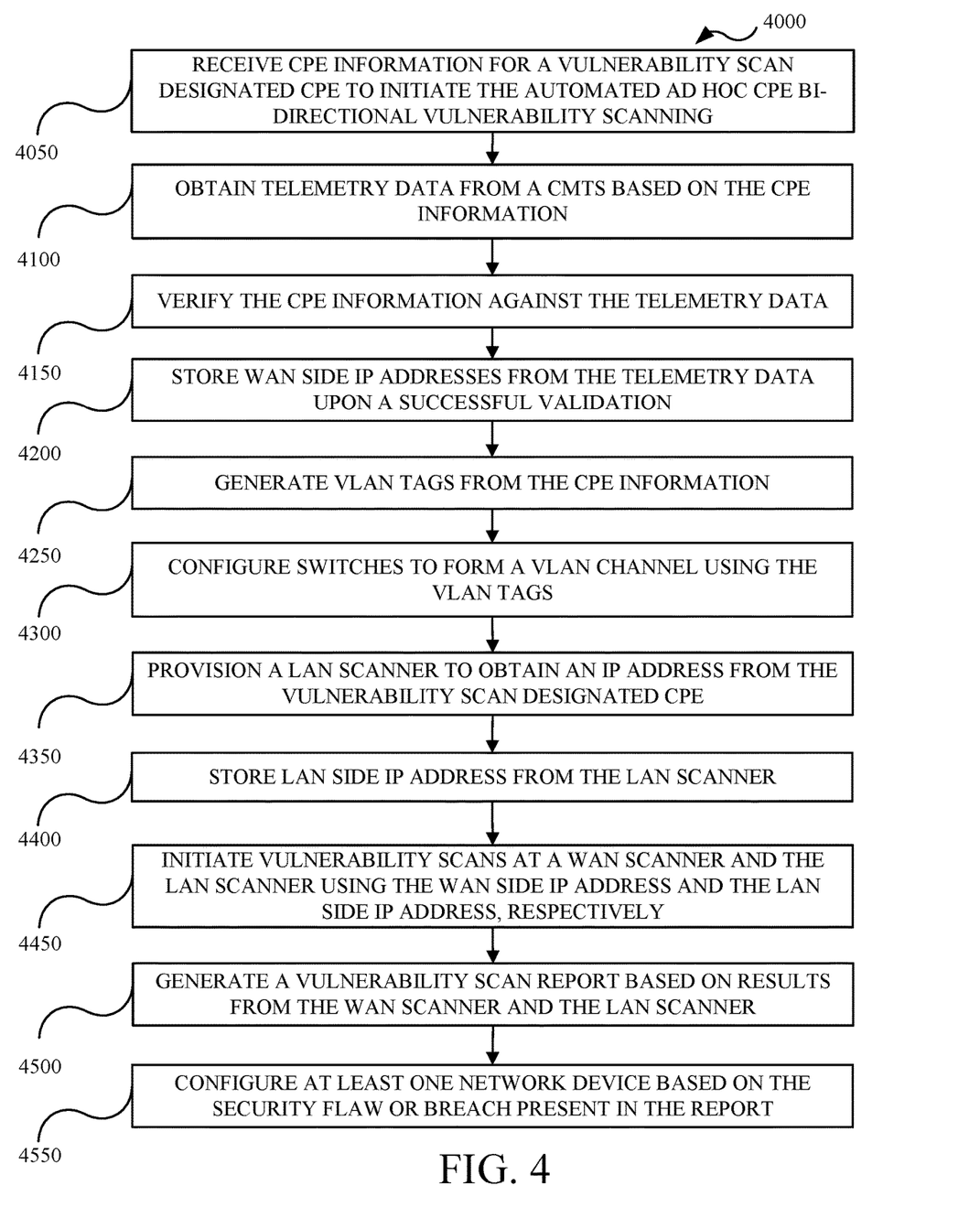
FIG. 4 is a flowchart of an example method for automated ad hoc CPE bi-directional vulnerability scanning in accordance with embodiments of this disclosure.

FIG. 4 is a flowchart of an example method 4000 for automated ad hoc CPE bi-directional vulnerability scanning in accordance with embodiments of this disclosure. The method 4000 includes: receiving 4050 CPE information for a vulnerability scan designated CPE to initiate the automated ad hoc CPE bi-directional vulnerability scanning; obtaining 4100 telemetry data from a CMTS based on the CPE information; verifying 4150 the CPE information against the telemetry data; storing 4200 WAN side IP addresses from the telemetry data upon a successful validation; generating 4250 VLAN tags from the CPE information; configuring 4300 switches to form a VLAN channel using the VLAN tags; provisioning 4350 a LAN scanner to obtain an IP address from the vulnerability scan designated CPE; storing 4400 LAN side IP address from the LAN scanner; initiating 4450 vulnerability scans at a WAN scanner and the LAN scanner using the WAN side IP address and the LAN side IP address, respectively; generating 4500 a vulnerability scan report based on results from the WAN scanner and the LAN scanner; configuring 4550 at least one network device based on the security flaw or breach present in the report. For example, the method 4000 may be implemented, as applicable and appropriate, by the CPE 1100 (CPE$_1$, CPE$_2$, . . . , CPE$_N$ 1110), the CMTS 1200, the auto provisioning server 1300, the WAN scanner 1400, the ticketing system 1500, the LAN scanner 1600, and the switches 1700, the processor 3100, the memory/storage 3200, the communication interface 3300, and the applications 3400.

The method 4000 includes receiving 4050 CPE information for a vulnerability scan designated CPE to initiate the automated ad hoc CPE bi-directional vulnerability scanning. In implementations, an auto provisioning server can send a request to a job server or ticketing system for a CPE for which a vulnerability scan is needed. The requests can be sent ad hoc, on demand, periodic, event driven, or combinations thereof. In implementations, the auto provisioning server can receive designated CPEs from an external server to initiate vulnerability scans. The designations can be received ad hoc, on demand, periodic, event driven, or combinations thereof. The CPE information can include a MAC address and location information for the designated CPE.

The method 4000 includes obtaining 4100 telemetry data from a CMTS based on the CPE information. The auto provisioning server can use the MAC address to obtain from a CMTS, which is connected to the designated CPE, telemetry data. In implementations, the telemetry data includes, but is not limited to, CPE telemetry data, CMTS telemetry data, network telemetry data, MAC address, CPE type, termination system, software version, the make and/or model of the designated CPE, and the like.

The method 4000 includes verifying 4150 the CPE information telemetry data against the telemetry data. The auto provisioning server can validate or verify the configuration by comparing the telemetry data with the CPE information.

The method 4000 includes storing 4200 WAN side IP address(es) from the telemetry data upon a successful validation. The WAN side IP address(es) are in the telemetry data obtained from the CMTS. Although CMTS is used herein, any termination system or line can be used in the methods described herein.

The method 4000 includes generating 4250 VLAN tags from the CPE information. The auto provisioning server can use the location information to generate a VLAN tag as described herein or using similar techniques.

The method 4000 includes configuring 4300 switches to form a VLAN channel using the VLAN tags. The auto provisioning server can configure the switches to construct the VLAN channel to connect a LAN scanner to the designated CPE.

The method 4000 includes provisioning 4350 a LAN scanner to obtain a LAN side IP address from the vulnerability scan designated CPE. The auto provisioning server can provision the LAN scanner to request and receive the LAN side IP address using DHCP provisioned on the LAN scanner and the designated CPE.

The method 4000 includes storing 4400 LAN side IP address from the LAN scanner. The auto provisioning server can obtain the LAN side IP address from the LAN scanner.

The method 4000 includes initiating 4450 vulnerability scans at a WAN scanner and the LAN scanner using the WAN side IP address and the LAN side IP address, respectively. The auto provisioning server can send the WAN side IP address and the LAN side IP address to the WAN scanner and the LAN scanner to initiate the bi-directional vulnerability scans.

The method 4000 includes generating 4500 a vulnerability scan report based on results from the WAN scanner and the LAN scanner. The WAN scanner and the LAN scanner can send the results of the vulnerability scans to the auto provisioning server.

The method 4000 includes configuring 4550 at least one network device based on the security flaw or breach present in the report. The auto provisioning server can send the report to the job server, ticketing system, or other external system which can use the report to configure network devices including the CMTS and the designated CPE based on security issues, breaches, flaws, and the like found at or in the designated CPE.

In general, a method for automated customer premise equipment (CPE) bi-directional vulnerability scanning includes receiving, by an auto provisioning server, CPE information for a designated CPE to initiate a bi-directional vulnerability scan, obtaining, by the auto provisioning server, telemetry data from a cable modem termination system (CMTS) based on the CPE information, configuring, by the auto provisioning server using the CPE information, switches to form a virtual local area network (VLAN) channel between a LAN scanner and the designated CPE, provisioning, by the auto provisioning server, the LAN scanner to obtain a LAN side Internet Protocol (IP) address from the designated CPE, initiating, by the auto provisioning server, vulnerability scans at a wide area network (WAN) scanner and the LAN scanner using a stored WAN side IP address and a stored LAN side IP address, respectively, generating, by the auto provisioning server, a vulnerability scan report based on results from the WAN scanner and the LAN scanner, and configuring at least one network device based on the report. In implementations, the method further includes verifying, by the auto provisioning server, the CPE information with the telemetry data. In implementations, the CPE information includes Media Access Control (MAC) address and location information of the designated CPE. In implementations, the telemetry data is obtained using the MAC address of the designated CPE. In implementations, the method further includes generating, by the auto provisioning server, a VLAN tag from the CPE information. In implementations, the VLAN tag is generated based on the location information. In implementations, the method further includes storing, by the auto provisioning server, a WAN side IP address from the telemetry data upon a successful verification of the CPE information. In implementations, the method further includes storing, by the auto provisioning server, a LAN side IP address from the LAN scanner. In implementations, the report identifies at least one security flaw or breach.

In general, a system includes a controller, a service provider facing scanner, a customer facing scanner, a plurality of switches, a termination equipment, a plurality of customer premise equipment (CPEs) in communication with the termination equipment, the service provider facing scanner, and the plurality of switches, a scan controller in communication with the controller, the service provider facing scanner, the customer facing scanner, the plurality of switches, and the termination equipment. The scan controller configured to obtain from the controller a selected CPE from the plurality of CPEs and Media Access Control (MAC) address and location information associated with the selected CPE, obtain telemetry data from the termination equipment using the MAC address, validate the MAC address and location information with the telemetry data, generate a virtual local area network (VLAN) tag using the location information to establish, via the plurality of switches, a pathway between the customer facing scanner and the selected CPE upon a successful validation, provision the customer facing scanner to obtain a customer facing side Internet Protocol (IP) address from the selected CPE, send vulnerability scan requests to the service provider facing scanner and the customer facing scanner using a service provider IP address obtained from the termination equipment and the customer facing IP address, respectively, and generate a vulnerability scan report based on results from the service provider scanner and the customer facing scanner. The controller configured to configure at least one network device based on the report. In implementations, the scan controller configured to configure the plurality of switches using the VLAN tags. In implementations, the scan controller configured to store a service provider facing IP address from the telemetry data upon a successful validation of the MAC address and the location information. In implementations, the scan controller configured to store a customer facing IP address from the customer facing scanner. In implementations, the report identifies at least one security flaw or breach.

In general, a method for automated bi-directional vulnerability scanning includes obtaining, by an auto provisioning controller, a customer premise equipment (CPE) on which to perform a scan and associated CPE data, validating, by the auto provisioning server, the CPE data against telemetry data obtained from termination equipment associated with CPE, generating, by the auto provisioning server, a virtual local area network (VLAN) tag using the CPE data, establishing, by the auto provisioning server, a path between a customer scanner and the CPE by configuring switches using the VLAN tag, provisioning, by the auto provisioning controller, the customer scanner to obtain a customer side Internet Protocol (IP) address from the CPE, requesting, by the auto provisioning controller, scans at a service provider scanner and the customer scanner using a service provider IP address and the customer side IP address, respectively, generating, by the auto provisioning controller, a vulnerability scan report based on results from the service provider scanner and the customer scanner, and configuring at least one network device based on the report. In implementations, the CPE data includes Media Access Control (MAC) address and location information of the CPE. In implementations, the telemetry data is obtained using the MAC address of the CPE. In implementations, the VLAN tag is generated from the location information. In implementations, the service provider IP address is obtained from the telemetry data. In implementations, the report identifies at least one security flaw or breach.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automated customer premise equipment (CPE) bi-directional vulnerability scanning, the method comprising:
   obtaining, by an auto provisioning server, telemetry data from a cable modem termination system (CMTS) based on CPE information for a CPE for which a bi-directional vulnerability scan is to be performed;
   configuring, by the auto provisioning server using the CPE information, switches to form a virtual local area network (VLAN) channel between a LAN scanner and the designated CPE;
   initiating, by the auto provisioning server, bi-directional vulnerability scans at a wide area network (WAN) scanner and the LAN scanner using a stored WAN side IP address and a stored LAN side IP address, respectively; and
   configuring at least one network device based on results from the bi-directional vulnerability scans of the WAN scanner and the LAN scanner.

2. The method of claim 1, the method further comprising: confirming, by the auto provisioning server, the CPE information with the telemetry data.

3. The method of claim 1, wherein the CPE information includes Media Access Control (MAC) address and location information of the designated CPE.

4. The method of claim 3, wherein the telemetry data is obtained using the MAC address of the designated CPE.

5. The method of claim 1, the method further comprising: generating, by the auto provisioning server, a VLAN tag from the CPE information.

6. The method of claim 5, the method further comprising: generating, by the auto provisioning server, a VLAN tag from location information in the CPE information.

7. The method of claim 1, the method further comprising: storing, by the auto provisioning server, the WAN side IP address from the telemetry data upon a successful confirmation of the CPE information.

8. The method of claim 1, the method further comprising: provisioning, by the auto provisioning server, the LAN scanner to obtain the LAN side Internet Protocol (IP) address from the designated CPE; and
   storing, by the auto provisioning server, the LAN side IP address from the LAN scanner.

9. The method of claim 1, the method further comprising: generating, by the auto provisioning server, a vulnerability scan report based on results from the WAN scanner and the LAN scanner, wherein the report identifies at least one security flaw or breach.

10. A system comprising:
    a controller;
    a service provider facing scanner;
    a customer facing scanner;
    a plurality of switches;
    a termination equipment;
    a plurality of customer premise equipment (CPEs) in communication with the termination equipment, the service provider facing scanner, and the plurality of switches;
    a scan controller in communication with the controller, the service provider facing scanner, the customer facing scanner, the plurality of switches, and the termination equipment, the scan controller configured to:
      collect telemetry data from the termination equipment using a Media Access Control (MAC) address for a selected CPE from the plurality of CPEs;
      determine a virtual local area network (VLAN) tag using the location information to establish, via the plurality of switches, a pathway between the customer facing scanner and the selected CPE; and
      send vulnerability scan requests to the service provider facing scanner and the customer facing scanner using a service provider Internet Protocol (IP) address obtained from the termination equipment and a customer facing IP address obtained from the selected CPE, respectively; and
    the controller configured to configure at least one network device based on results from the vulnerability scan requests.

11. The system of claim 10, the scan controller configured to validate the MAC address and location information for the selected CPE with the telemetry data.

12. The system of claim 10, the scan controller configured to store the service provider facing IP address from the telemetry data upon a successful validation of the MAC address and the location information.

13. The system of claim 10, the scan controller configured to store the customer facing IP address from the customer facing scanner.

14. The system of claim 10, wherein the results identify at least one security flaw or breach.

15. A method for automated bi-directional vulnerability scanning, the method comprising:
    validating, by an auto provisioning server, telemetry data obtained from termination equipment associated with customer premise equipment (CPE) on which to perform a scan against CPE data provided by the CPE;
    establishing, by the auto provisioning server, a path between a customer scanner and the CPE by configuring switches using a virtual local area network (VLAN) tag generated from the CPE data;
    provisioning, by the auto provisioning controller, the customer scanner to obtain a customer side Internet Protocol (IP) address from the CPE;
    requesting, by the auto provisioning controller, scans at a service provider scanner and the customer scanner using a service provider Internet Protocol (IP) address and a customer side IP address obtained from the CPE, respectively; and
    configuring at least one network device based on results from the scans.

16. The method of claim 15, wherein the CPE data includes Media Access Control (MAC) address and location information of the CPE.

17. The method of claim 16, wherein the telemetry data is obtained using the MAC address of the CPE.

18. The method of claim 16, wherein the VLAN tag is generated from the location information.

19. The method of claim 15, wherein the service provider IP address is obtained from the telemetry data.

20. The method of claim 15, wherein the results identify at least one security flaw or breach.

* * * * *